(12) United States Patent
Mariotti et al.

(10) Patent No.: US 10,865,860 B2
(45) Date of Patent: Dec. 15, 2020

(54) CONTINUOUSLY VARIABLE TRANSMISSION DEVICE WITH GEAR REGULATION DEVICE

(71) Applicant: PIAGGIO & C. S.p.A., Pisa (IT)

(72) Inventors: Walter Mariotti, Pisa (IT); Giacomo Freschi, Pisa (IT); Paolo Nesti, Pisa (IT)

(73) Assignee: PIAGGIO & C. S.p.A., Pisa (IT)

( * ) Notice: Subject to any disclaimer, the term of this patent is extended or adjusted under 35 U.S.C. 154(b) by 274 days.

(21) Appl. No.: 16/060,750

(22) PCT Filed: Dec. 1, 2016

(86) PCT No.: PCT/IB2016/057255
§ 371 (c)(1),
(2) Date: Jun. 8, 2018

(87) PCT Pub. No.: WO2017/098381
PCT Pub. Date: Jun. 15, 2017

(65) Prior Publication Data
US 2018/0372191 A1    Dec. 27, 2018

(30) Foreign Application Priority Data

Dec. 10, 2015  (IT) .......................... 102015000081858

(51) Int. Cl.
*F16H 9/12* (2006.01)
*F16H 55/56* (2006.01)
(Continued)

(52) U.S. Cl.
CPC .............. *F16H 9/125* (2013.01); *F16H 9/18* (2013.01); *F16H 55/563* (2013.01); *F16H 61/66254* (2013.01)

(58) Field of Classification Search
CPC ............. F16H 55/563; F16H 61/66245; F16H 63/067; F16H 55/56; F16H 2057/0203; F16H 9/18
(Continued)

(56) References Cited

U.S. PATENT DOCUMENTS 2,253,634 A * 8/1941  Mack ................ F16H 61/66245
                                                     474/13
2,496,201 A * 1/1950  Dodge .................... F16D 43/10
                                                     474/15
(Continued)

FOREIGN PATENT DOCUMENTS

| EP | 1 752 685 A1 | 2/2007 |
| JP | S61-171947 A1 | 8/1986 |
| WO | 2013/098689 A1 | 7/2013 |

OTHER PUBLICATIONS

International Search Report and Written Opinion of the International Searching Authority for International Patent Application No. PCT/IB2016/057255 dated Feb. 9, 2017, 9 pages.

*Primary Examiner* — Henry Y Liu
(74) *Attorney, Agent, or Firm* — Merchant & Gould P.C.

(57) ABSTRACT

A continuously variable transmission device (1) for a two-wheel, three-wheel or four-wheel motorcycle includes a gear shift regulation device suitable to operate on special rollers (18) through an adjustable axial action independently of the number of engine revolutions. The device influences the centrifugal movement of the rollers (18) and thus influences the gear shift.

12 Claims, 8 Drawing Sheets

(51) Int. Cl.
*F16H 9/18* (2006.01)
*F16H 61/662* (2006.01)

(58) Field of Classification Search
USPC .......................................................... 474/13
See application file for complete search history.

(56) References Cited

U.S. PATENT DOCUMENTS

| | | | | |
|---|---|---|---|---|
| 2,709,372 A * | | 5/1955 | Melone | F16H 55/56 474/13 |
| 2,928,286 A * | | 3/1960 | Davis | F16H 61/66245 474/13 |
| 3,625,079 A * | | 12/1971 | Hoff | B62M 25/00 474/12 |
| 3,680,403 A * | | 8/1972 | Schupan | F16H 61/66245 474/13 |
| 3,685,366 A * | | 8/1972 | Schupan | F16H 55/563 474/13 |
| 3,709,052 A * | | 1/1973 | Lassanske | F16H 55/563 474/13 |
| 3,916,707 A * | | 11/1975 | Wells | F16H 61/66245 474/14 |
| 4,028,953 A * | | 6/1977 | Lavallee | F16H 55/563 474/13 |
| 4,102,214 A * | | 7/1978 | Hoff | F16H 55/563 474/12 |
| 4,179,946 A * | | 12/1979 | Kanstoroom | F16H 61/66245 474/13 |
| 4,345,664 A * | | 8/1982 | Anno | F16H 61/66245 180/230 |
| 4,364,735 A * | | 12/1982 | Plamper | F16H 55/563 474/13 |
| 4,384,862 A * | | 5/1983 | Nakane | F16H 61/66245 192/105 B |
| 4,515,575 A * | | 5/1985 | Kinbara | F16H 61/66227 474/11 |
| 4,743,221 A * | | 5/1988 | Whiteman | F16H 55/563 474/13 |
| 4,943,264 A * | | 7/1990 | Whiteman, Jr. | F16H 55/563 474/13 |
| 5,108,347 A * | | 4/1992 | Gourdon | F16H 55/563 474/13 |
| 5,154,673 A * | | 10/1992 | Fukunaga | F16H 55/563 474/13 |
| 5,188,568 A * | | 2/1993 | Gourdon | F16H 55/563 474/13 |
| 5,242,330 A * | | 9/1993 | Tateno | F16H 61/66245 474/13 |
| 5,328,413 A * | | 7/1994 | Robert | F16H 55/563 474/13 |
| 5,458,539 A * | | 10/1995 | Landry | F16H 55/563 474/13 |
| 5,460,575 A * | | 10/1995 | Berto | F16H 55/563 474/11 |
| 5,514,040 A * | | 5/1996 | Robert | F16H 55/563 474/13 |
| 5,795,255 A * | | 8/1998 | Hooper | F16H 61/66245 474/14 |
| 6,155,940 A * | | 12/2000 | Templeton | F16H 55/563 474/12 |
| 6,174,260 B1 * | | 1/2001 | Tsukada | F16H 15/20 475/193 |
| 6,520,878 B1 * | | 2/2003 | Leclair | F16H 55/563 474/12 |
| 6,682,450 B2 * | | 1/2004 | Mukai | F16H 55/563 474/12 |
| 6,733,406 B2 * | | 5/2004 | Kitai | F16H 55/56 474/13 |
| 7,063,633 B2 * | | 6/2006 | Robert | F16H 55/563 474/13 |
| 7,090,600 B2 * | | 8/2006 | Lohr | F16H 55/563 474/14 |
| 7,172,523 B2 * | | 2/2007 | Borghi | F16H 55/563 192/3.54 |
| 7,276,004 B2 * | | 10/2007 | Wu | F16H 55/563 474/13 |
| 7,401,589 B2 * | | 7/2008 | Oishi | F01M 11/02 123/196 R |
| 7,637,828 B2 * | | 12/2009 | Murayama | F16H 55/563 474/12 |
| 7,803,074 B2 * | | 9/2010 | Ishida | F16G 5/166 474/13 |
| 7,892,121 B2 * | | 2/2011 | Oishi | F16H 63/067 474/11 |
| 8,075,432 B2 * | | 12/2011 | Oishi | F16C 19/54 474/70 |
| 8,105,190 B2 * | | 1/2012 | Galletti | F16D 43/18 192/105 CD |
| 8,187,127 B2 * | | 5/2012 | Ishida | F16H 55/56 474/46 |
| 8,382,620 B2 * | | 2/2013 | Morita | F16H 9/18 474/13 |
| 8,409,039 B2 * | | 4/2013 | Beyer | F16H 55/563 474/14 |
| 9,228,644 B2 * | | 1/2016 | Tsukamoto | F16H 63/067 |
| 9,267,580 B2 * | | 2/2016 | Aitcin | F16H 9/125 |
| 9,476,486 B2 * | | 10/2016 | Hochmayr | F16H 63/065 |
| 9,500,264 B2 * | | 11/2016 | Aitcin | F16H 9/14 |
| 9,518,641 B2 * | | 12/2016 | Mariotti | F16H 61/66245 |
| 9,644,717 B2 * | | 5/2017 | Aitcin | F16H 55/56 |
| 10,054,211 B2 * | | 8/2018 | Zulawski | F16H 9/12 |
| 10,393,263 B2 * | | 8/2019 | Simpson | F16H 63/067 |
| 2002/0119846 A1 * | | 8/2002 | Kitai | F16H 55/56 474/14 |
| 2006/0258492 A1 * | | 11/2006 | Wu | F16H 55/563 474/13 |
| 2014/0315670 A1 * | | 10/2014 | Mariotti | F16H 9/12 474/12 |

* cited by examiner

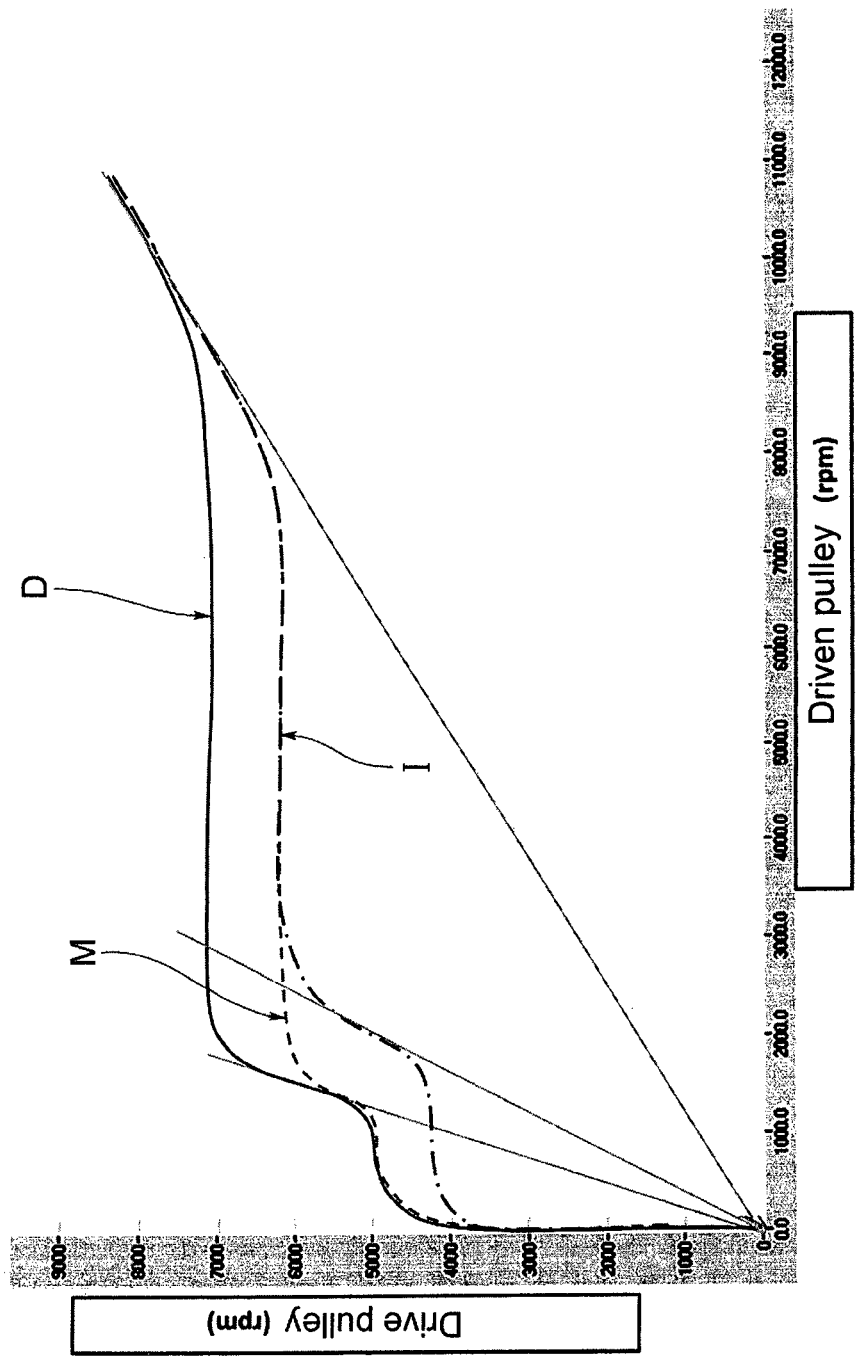

CONTINUOUSLY VARIABLE TRANSMISSION DEVICE WITH GEAR REGULATION DEVICE

This application is a National Stage Application of PCT/IB2016/057255, filed 1 Dec. 2016, which claims benefit of Ser. No. 10/2015000081858, filed 10 Dec. 2015, and which applications are incorporated herein by reference. To the extent appropriate, a claim of priority is made to each of the above-disclosed applications.

BACKGROUND OF THE INVENTION

The present invention relates to a transmission system, in particular a continuously variable transmission system for motorcycles, provided with a regulation device of the gear shift curve.

In this document the term "motorcycle" means a vehicle with two, three or four wheels, pivoting or non-pivoting, such as the Vespa®, Ape® or MP3® vehicles marketed by the Applicant.

The Continuously Variable Transmission (CVT) is a type of automatic transmission for vehicles in which the transmission ratio can vary continuously between two limit values. The continuous transmission is widely used in two-wheeled vehicles with a small and medium engine size, in particular motor scooters.

In a CVT, the variation of the transmission ratio takes place by varying the winding diameter of the belt on two pulleys, one of which is the drive pulley and the other driven, and at least one of these has the ability to draw together and distance the two parts or half-pulleys which it is composed of.

Typically, the drive pulley comprises a speed regulator made with centrifugal masses, generically referred to as "rollers", which have the task of realizing the axial drawing together of the respective half-pulleys, passing from the low gear condition (half-pulleys distant) to the condition of high gear (half-pulleys juxtaposed).

Devices are known of for regulating the gear shift curve, which, when the CVT is in the low gear condition, allow blocking of some of the rollers, thus preventing them from participating in the juxtaposition of the half-pulleys. Said half-pulleys thus reach a predefined axial distance at a greater number of engine revolutions, giving the CVT a more sporting set-up.

Conversely, if all the rollers participate in the juxtaposition of the half-pulleys, these find themselves at said axial distance at a lower number of engine revolutions, giving the CVT a more touring set-up.

An example of embodiment of such a device for the adjustment of the gear shift curve is described in the document WO-A1-2013/098689 in the name of the Applicant.

However, such a regulation device has the drawback of allowing activation and deactivation only in the presence of the low gear condition, i.e. when the rollers are next to the drive shaft, to avoid impact due to the sudden release of the rollers in the gear shift phase.

SUMMARY OF THE INVENTION

The object of the present invention is to provide a transmission device which satisfies the needs mentioned above and which at the same time overcomes the drawbacks of the prior art.

BRIEF DESCRIPTION OF THE DRAWINGS

The characteristics and advantages of the transmission device will be evident from the description given below, by way of a non-limiting example, according to the appended drawings, wherein:

FIG. 4 shows a longitudinal cross-section view of the transmission device in FIG. 1, in a low gear configuration and with the regulation device on;

FIG. 5 shows the transmission device in FIG. 4, in a high gear configuration, with the regulation device on;

FIG. 7 shows a graph of the gear shift trend in a transmission device according to the present invention.

DETAILED DESCRIPTION OF THE PREFERRED EMBODIMENT

Figure 1:
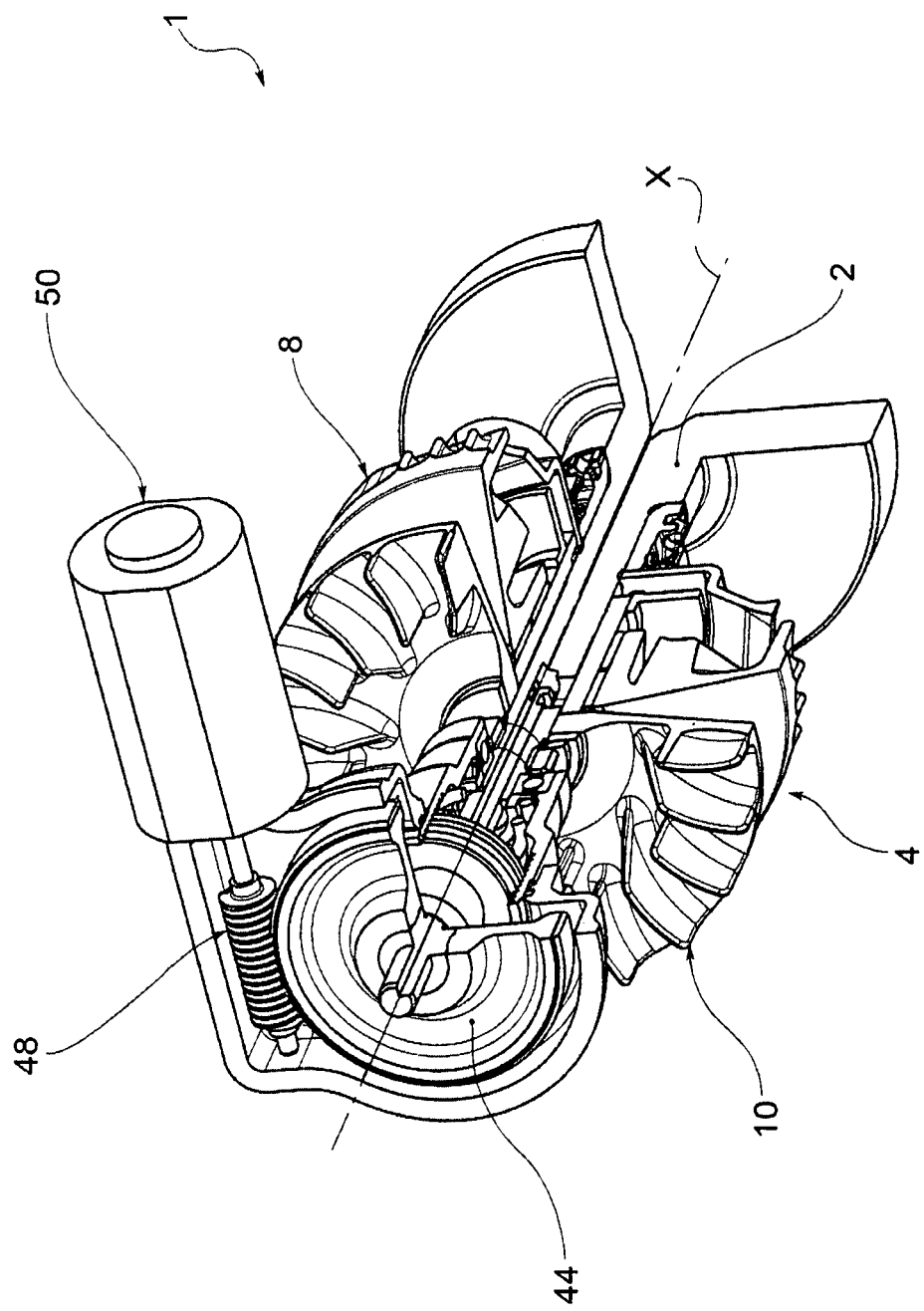
FIG. 1 shows a transmission device for vehicles according to a preferred embodiment of the present invention.

With reference to the appended drawings, reference numeral 1 globally denotes a continuously variable transmission device, configured to be applied preferably to a two/three-wheel motorcycle, engaged with a drive shaft 2 which defines an axis of rotation X.

The transmission device 1 comprises a first drive pulley 4, driven in rotation by the drive shaft 2, and a second driven pulley (not shown), connected to each other by a V-belt 6.

The drive pulley 4 is composed of a first half-pulley 8 and a second half-pulley 10, respectively provided with facing, truncated-cone active surfaces 8a, 10a, sliding along said axis of rotation X so as to juxtapose and distance the active surfaces 8a, 10a, and integral with each other in rotation.

The first half-pulley 8 comprises a speed regulator 12 comprising a container 14, integral in translation with the active surface 8a, provided with a contoured seat 16, and a plurality of special rollers 18, housed in the seat 16.

The special rollers 18 are provided with engagement means suitable to be pushed by counter-engagement means of the transmission device.

The rollers realize centrifugal masses which, as the number of engine revolutions increases, push the first half-pulley 8 towards the second half-pulley 10. This way, the winding diameter of the belt 6 on the drive pulley 4 increases and the belt, not being able to stretch, operates to decrease the winding diameter on the driven pulley, increasing the transmission ratio (high gear).

To such purpose the seat 16 is provided with a bottom surface 16a which the rollers, having a tapered shape towards the second half pulley 10 slide on, so that, when the rollers move centrifugally, they push the container 14 towards the second half pulley 10.

Each roller 18 comprises a movable body 19, intended to move, preferably to drag, on the bottom surface 16a of the seat 16 and the cover 20, and a stem 21 that extends away from the mobile body 19, ending with a foot 24.

The stem 21 forms an example of said engagement means suitable to be pushed by counter-engagement means of the transmission device.

The drive pulley 4 further comprises, preferably, a roller contrast cover 20, for example fixed to the drive shaft 2, suitable to contain the rollers 18 in the seat 16.

The transmission device 1 further comprises a gear shift regulation device able to influence the movement of the rollers 18 as a function of an axial load adjustable independently of the number of revolutions of the motor shaft.

In particular, the gear shift regulation device is able to influence the movement of the rollers 18 so as to accentuate the centrifugal movement as a function of an axial load adjustable independently of the number of revolutions of the motor shaft.

The gear shift regulation device comprises an abutment element 22, for example in the shape of a flange coaxial to the motor shaft 2 having a predefined radial extension, placed facing the seat 16 of the container 14, in such a way that the rollers 18 are axially arranged between said abutment element 22 and the bottom surface 16a of the seat 16. The abutment element 22 is suitable to influence the rollers 18 to facilitate the axial displacement thereof and thus realize an example of said counter-engagement means.

The regulation device comprises axial action means suitable to exert on the element abutment 22 an axial action of adjustable intensity.

In particular, said axial action means comprise a transmission slide 26, for example supported by the motor shaft 2, movable axially to drag the abutment element 22 and bring it axially to push the rollers 18 on the bottom surface 16a of the seat 16, thus facilitating the centrifugal displacement thereof by virtue of the configuration of said bottom surface 16a.

Furthermore, the axial action means comprise an actuating pin 28 movable axially and axially constrained to the transmission slide 26, the actuating pin 28 has an axial extension such that a head 30 of said pin 28 protrudes from the drive pulley 4, on the side of the second semi-pulley 10, i.e. on the side opposite that of the drive shaft 2.

The axial action means further comprises an elastic element 32, for example fitted on the actuating pin 28 to influence it permanently in the direction in which the abutment element 22 juxtaposes the bottom surface 16a.

For example, the elastic element 32 is in compression between the head 30 of the pin 28 and an axially fixed abutment 34, preferably external to the pulley 4.

The axial action means further comprise an inhibiting device suitable to operate to regulate the intensity of the axial action exerted by said axial action means on the abutment element 22.

For example, said inhibiting device operates on the pin 28 in the direction to counteract the action of the elastic element 32, for example by pushing said pin 28 in the direction moving the abutment element 22 away from the bottom surface 16a.

Consequently, when the inhibiting device is switched off, there is an axial load of the spring that is transmitted to the rollers and is added to the centrifugal action to move the rollers centrifugally.

Preferably, the inhibiting device comprises a support element 36 that operates axially on the pin 28, a threaded bushing 38 that operates on the support element 36, and a housing 40 provided with a threaded portion 42, on which the threaded bushing 38 is screwed.

The inhibiting device also comprises a toothed wheel 44 provided with a splined shaft 46 coupled for rotation with the threaded bushing 38, and a worm gear 48 that meshes with the toothed wheel 44, realising a skewed-axis kinematic mechanism.

The inhibiting device lastly comprises an electric motor 50 coupled with the worm gear 48 to rotatably actuate it.

Figure 2:
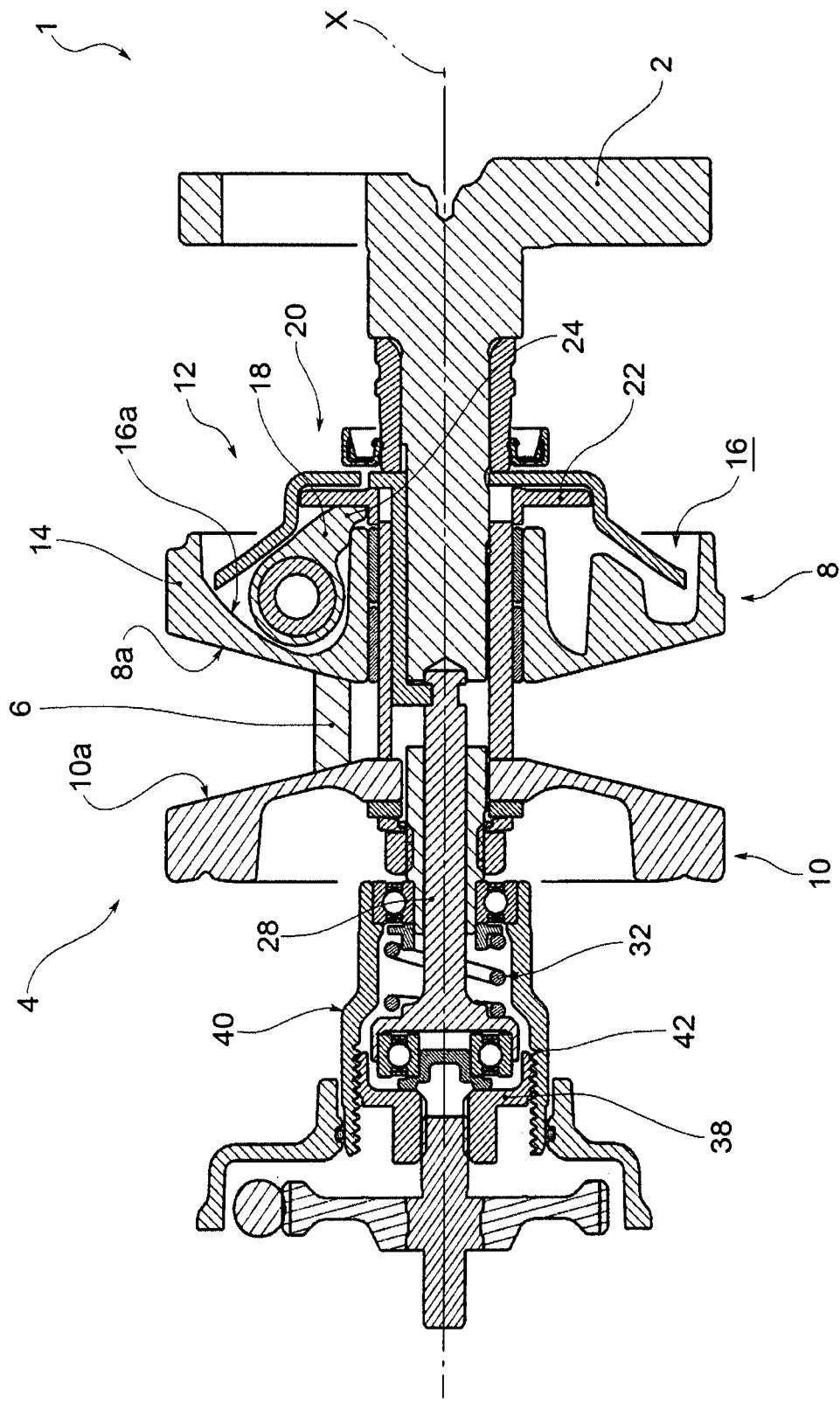
FIG. 2 shows a longitudinal cross-section view of the transmission device in FIG. 1, in a low gear configuration and with the regulation device off.

In a first configuration, the low gear is engaged and the gear shift regulation device is off (FIG. 2).

The rollers are arranged in a radial internal limit position.

In this configuration, the axial action means are configured so as not to transmit to the abutment element 22 any axial load drawing the abutment element 22 towards the bottom surface 16a.

To such purpose, the threaded bushing 38 is screwed onto the threaded portion 42 of the housing 40, so as to counteract the action of the elastic element 32 on the pin 28.

Consequently, upon an increase of the engine revolutions, the rollers 18 undergo a centrifugal movement, without the abutment element 22 influencing said displacement.

Figure 3:
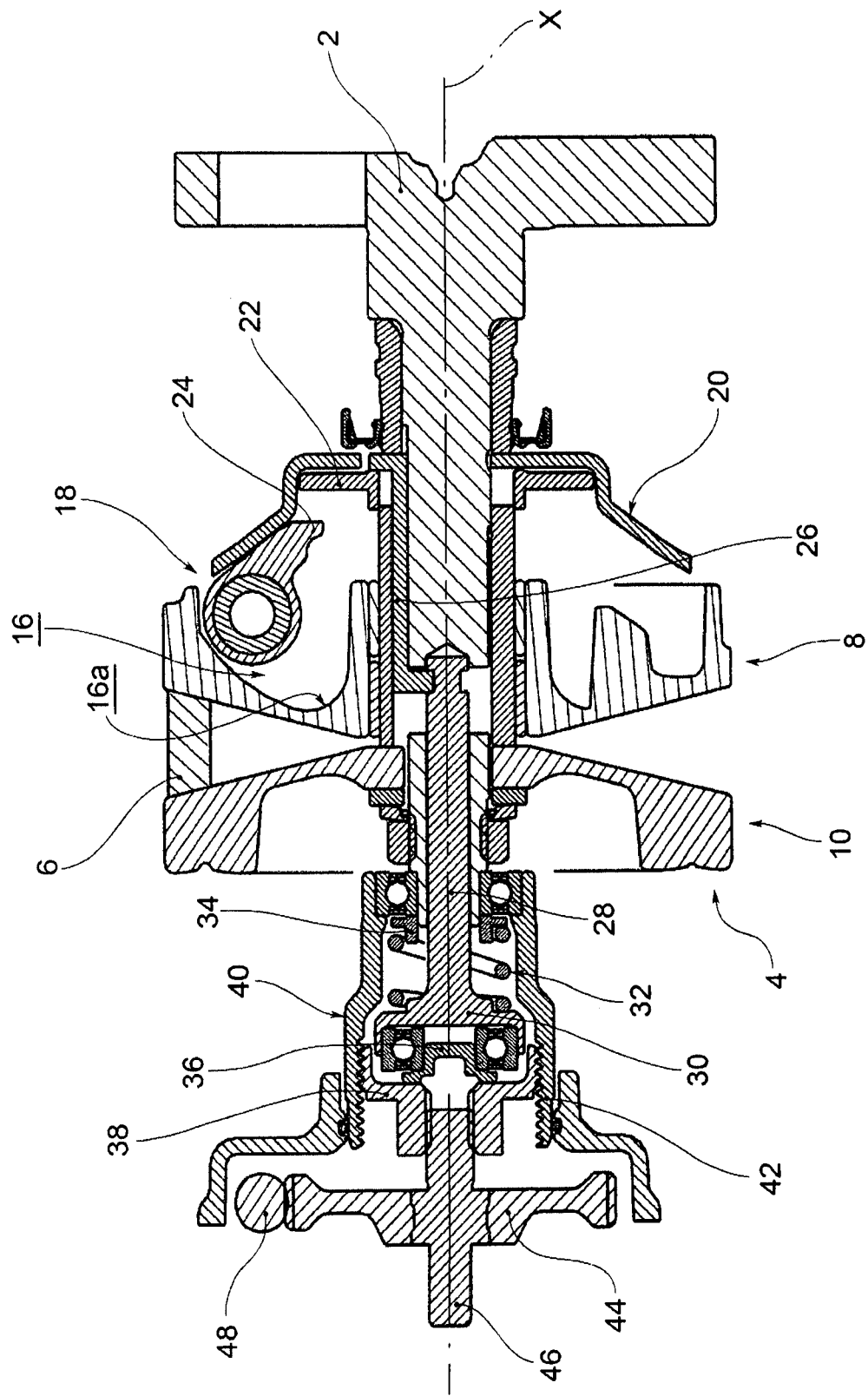
FIG. 3 shows the transmission device in FIG. 2, in a high gear configuration, with the regulation device off.

The transition into a high gear is thus achieved with the regulation device off (FIG. 3).

In this configuration, the limit position of the rollers 18, defined outer radial limit position, is defined by the cover 20, which keeps them in the seat 16.

If, starting from this configuration, the regulation device is progressively activated, the axial action means operate on the abutment element 22 with an action approaching the bottom surface 16a, until said abutment element 22 engages the rollers 18 (in particular, the foot 24 of the stem 22), without changing its position.

In order for the axial action means to operate on the abutment element 22, the threaded bushing 38 is unscrewed from the threaded portion 42 of the housing 40, so as to limit the counter action to the elastic element 32.

Figure 4:
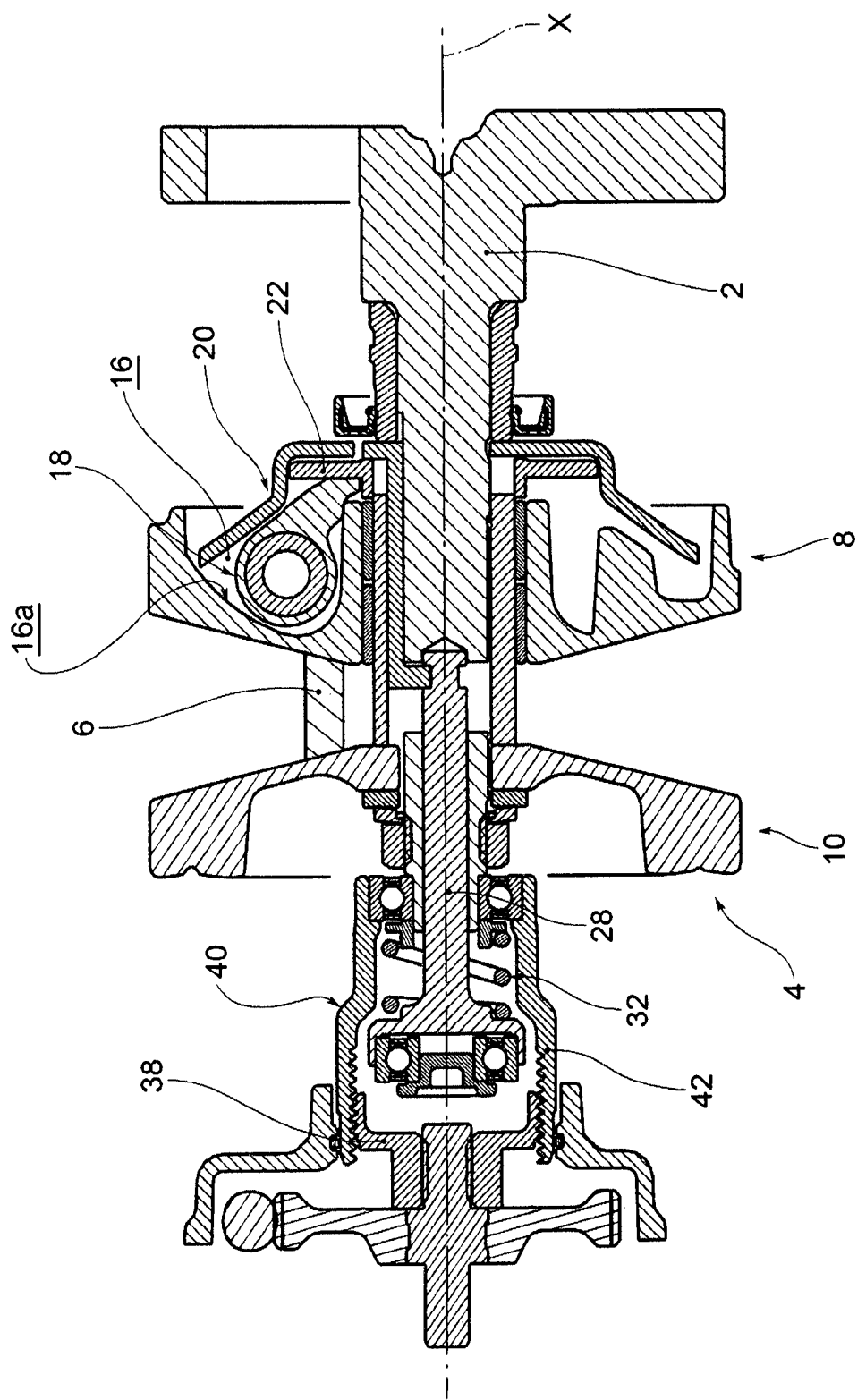

In a further configuration, the low gear is engaged and the gear shift regulation device is switched on (FIG. 4). The rollers 18 are arranged in a radial internal limit position.

In such a configuration, the axial action means transmit to the abutment element 22 an axial load moving the abutment element 22 towards the bottom surface 16a, so as to push the rollers on the bottom surface 16a and increase the centrifugal movement.

To such purpose, the threaded bushing 38 is unscrewed from the threaded portion 42 of the housing 40, so as not to counteract the action of the elastic element 32 on the pin 28.

As a result, as the engine revolutions increase, the rollers 18 will have the tendency to move centrifugally, to a greater extent than in the condition with the axial action means switched off.

Figure 5:
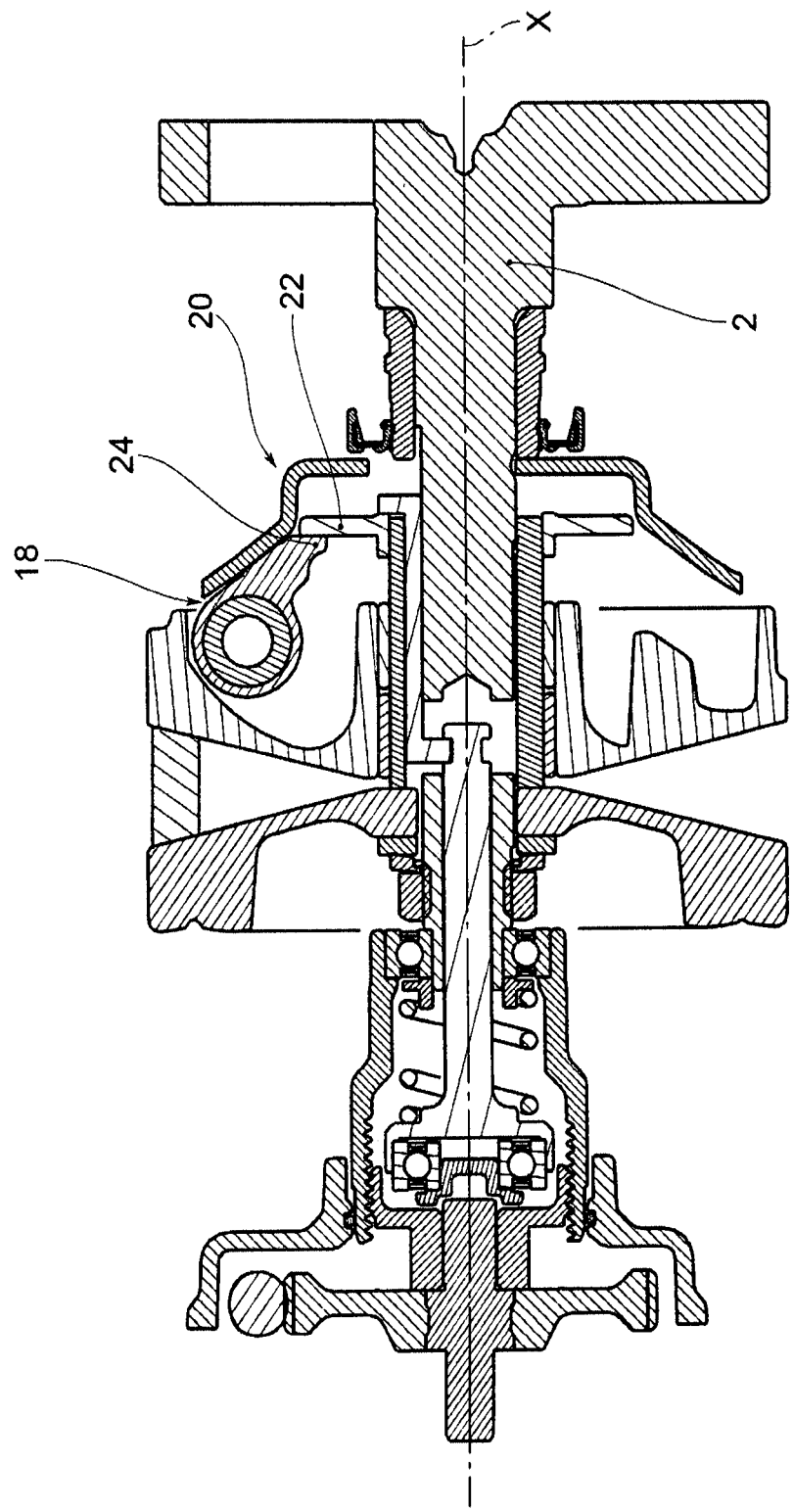
Figure 6A:
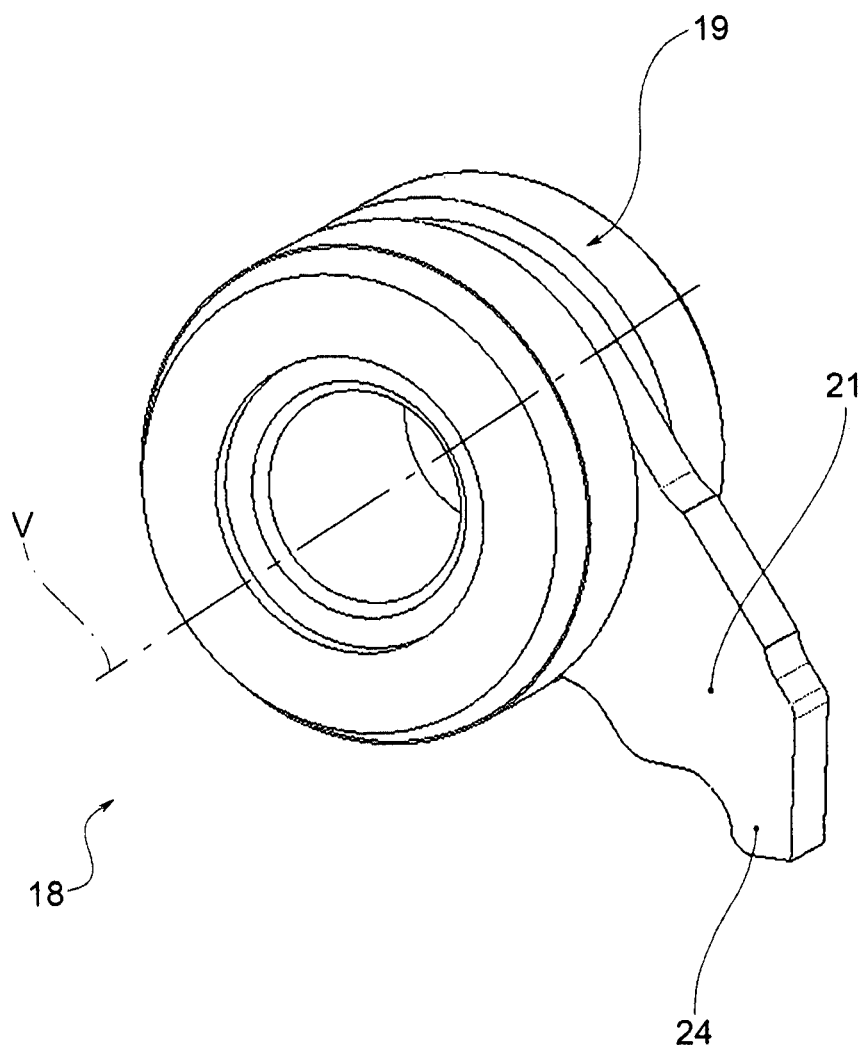
FIGS. 6a and 6b show a roller of the transmission device according to the present invention.
Figure 6B:
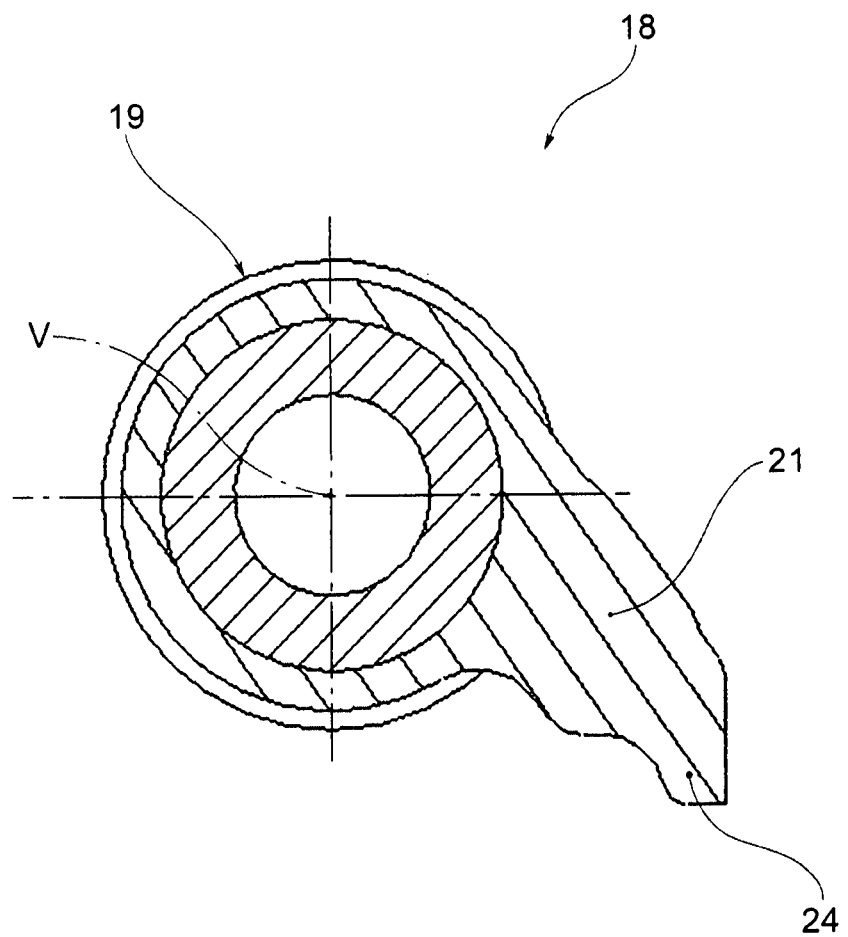

The transition into a high gear is however achieved with the regulation device on (FIG. 5).

In this configuration, the abutment element 22 preferably remains in contact with the foot 24 of the rollers 18; if the regulation device is switched off, the abutment element 22 instead detaches from the roller 18. The configuration assumed by the transmission device is the one which the device would assume at the current engine revolutions with the regulation device switched off.

FIG. 7 shows a graph with the number of revolutions of the drive pulley given as a function of the number of revolutions of the driven pulley, in condition of the regulation device off (curve D), so that the vehicle set-up is more sporting, in condition of the regulation device on (curve I), so that the vehicle set-up is more touring and in an intermediate condition (M) in which the regulation device, initially off, is switched on during the gear shift.

Innovatively, the transmission system according to the present invention overcomes the drawbacks mentioned with reference to the prior art since it permits changing of the gear shift curve both at low and at high speeds.

Advantageously, moreover, by switching on the regulation device in a low gear condition, it shifts the gear change to towards lower revolutions, lowering the clutch coupling in the start-up phase.

It is clear that a person skilled in the art may make modifications to the transmission system described above so as to satisfy contingent requirements, all contained within the scope of protection as defined by the following claims.

The invention claimed is:

1. A continuously variable transmission device for a two-wheel, three-wheel or four-wheel motorcycle, connectable to a drive shaft, comprising:
    a drive pulley rotatable about a rotation axis, comprising a first half-pulley carrying a first active surface and a second half-pulley carrying a second active surface, a V-belt being arranged between the active surfaces;
    a speed regulator comprising a container, provided with a seat having a bottom surface, and rollers provided with an engagement device, movable by centrifugal action on the bottom surface, moving radially and axially with respect to the bottom surface and thus imposing an axial sliding to said first half-pulley;
    a gear shift regulation device configured to operate on the rollers through an axial action adjustable independently of a quantity of engine revolutions, to influence the centrifugal movement of the rollers and to influence the gear shift;
    said gear shift regulation device comprising:
        an abutment element facing the seat of the container, wherein the rollers are axially arranged between the abutment element and the bottom surface of the seat;
        an axial action device configured to exert on the abutment element an axial action of adjustable intensity;
        wherein in a first configuration in which the gear shift regulation device is off, the axial action device is configured so no axial load is transmitted to the abutment element and the abutment element is not drawn toward the bottom surface; and in a second configuration in which the gear shift regulation device is on, the axial action device transmits to the abutment element an axial load moving the abutment element toward the bottom surface.

2. A transmission device according to claim 1, wherein the gear shift regulation device is able to influence movement of the rollers to accentuate the centrifugal action as a function of an axial load adjustable independently of the quantity of revolutions of the drive shaft.

3. A transmission device according to claim 1, wherein the axial action device comprises an actuation pin, operatively bound axially to the abutment element, and an elastic element configured to permanently influence the actuation pin to permanently influence the actuation pin in a direction of approach of the abutment element to the bottom surface.

4. A transmission device according to claim 1, wherein the axial action device comprises an inhibiting device configured to operate to regulate intensity of the axial action exerted by the axial action device on the abutment element.

5. A transmission device according to claim 4,
    wherein the axial action device comprises an inhibiting device configured to operate to regulate the intensity of the axial action exerted by the axial action device on the abutment element, and
    wherein the inhibiting device operates on the pin by opposing the action of the elastic element.

6. A transmission device according to claim 5, wherein the inhibiting device comprises a support element operating axially on the pin, a threaded bushing operating on the support element, and a housing provided with a threaded portion, wherein the threaded bushing is screwed on the threaded portion.

7. A transmission device according to claim 6, wherein the inhibiting device further comprises a toothed wheel provided with a splined shaft coupled for rotation with the threaded bushing, and a worm gear meshing with the toothed wheel, realising a skewed-axis kinematic mechanism.

8. A transmission device according to claim 7, wherein the inhibiting device comprises an electric motor coupled with the worm gear to rotatably actuate the worm gear.

9. A roller for a gear shift regulation device of a transmission device according to claim 1, comprising a mobile body and an engagement device configured to be pushed by a counter-engagement device of the regulation device to accentuate centrifugal movement.

10. A roller according to claim 9, wherein the engagement device comprises a stem extending away from the mobile body.

11. A transmission device according to claim 1, wherein in the first configuration in which the gear shift regulation device is off, the abutment element is detached from the rollers.

12. A transmission device according to claim 1, wherein in the second configuration in which the gear shift regulation device is on, the abutment element remains in contact with a foot of the rollers.

* * * * *